Nov. 25, 1952   K. L. DARRAH ET AL   2,619,206
CLUTCH AND BRAKE DEVICE
Filed Nov. 10, 1950
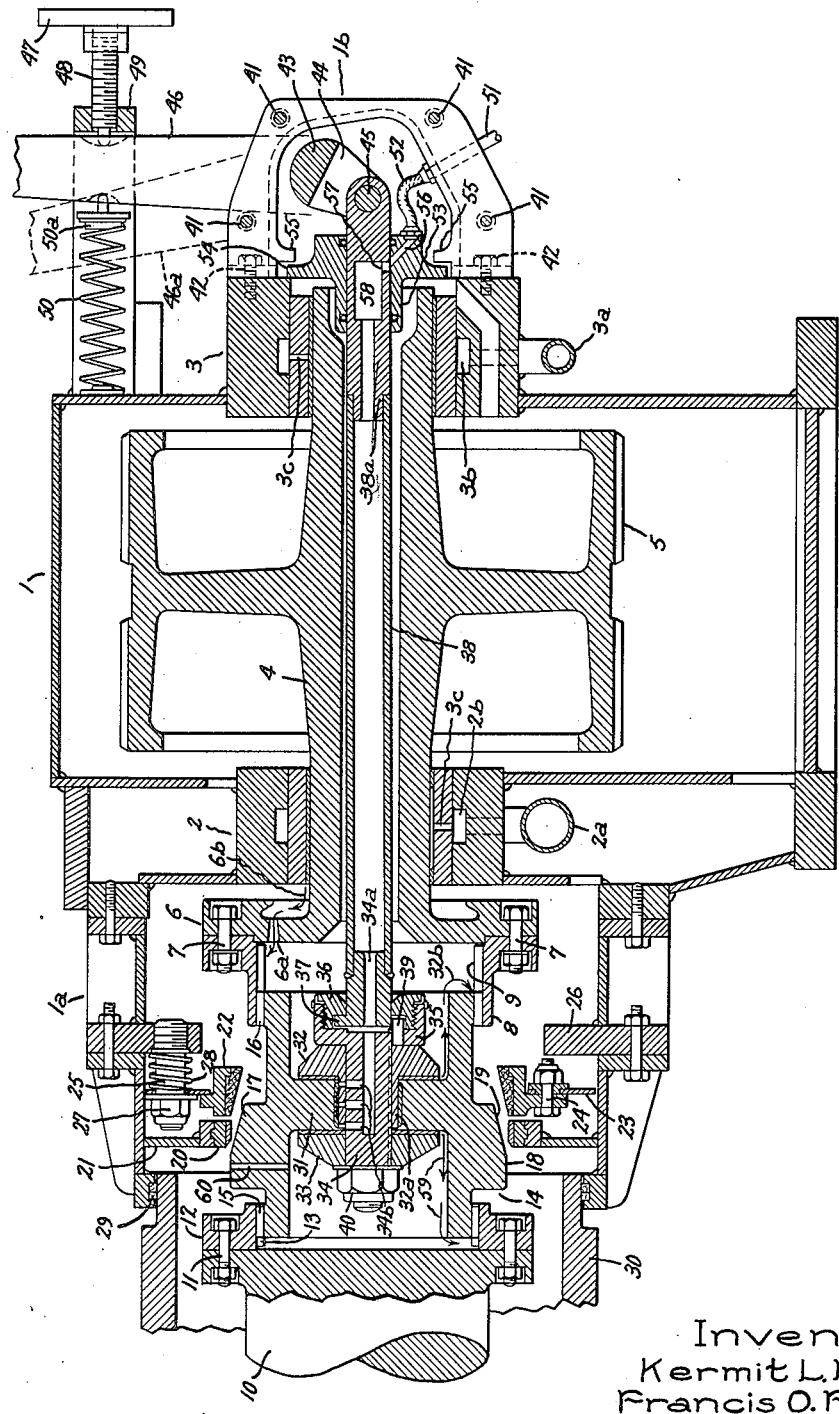
Inventors:
Kermit L. Darrah
Francis O. Fridell,
by Ernest C. Britton
Their Attorney.

Patented Nov. 25, 1952

2,619,206

UNITED STATES PATENT OFFICE 2,619,206

CLUTCH AND BRAKE DEVICE

Kermit L. Darrah, Lynnfield Center, and Francis O. Fridell, Lynnfield, Mass., assignors to General Electric Company, a corporation of New York Application November 10, 1950, Serial No. 194,955

4 Claims. (Cl. 192—17)

This invention relates to disengageable positive type couplings or clutches for disconnecting a prime mover from a driven machine, particularly to a clutch for disconnecting a steam turbine type of prime mover from the propeller shaft in a marine propulsion powerplant.

Marine powerplants for naval service often consist of a propulsion gear driven by a main turbine which has high efficiency at high loads and speeds. For optimum economy at low or "cruising" speeds, this main turbine is idled and a smaller "cruising turbine" is connected through a reduction gear to the rotor of the main turbine. This reduction gear permits the cruising turbine to run at a higher, more efficient, speed while cruising, but would run the turbine up to a destructive speed if left connected when the main turbine is driving the ship at full speed. Accordingly, a suitable clutch becomes necessary.

If the cruising turbine were simply disconnected from the main turbine, steam leaking past the control valves, or accidental opening of the valves, might run the idling turbine up to destructive speeds. Therefore some means for holding the cruising turbine rotor stationary is required.

The usual procedure is to change from cruising to main turbine when the ship is at rest. However, under emergency conditions, an immediate change without stopping the ship must be possible.

Accordingly, the object of the present invention is to provide an improved disengageable positive type clutch for a powerplant of the type described with a special brake arrangement for insuring that the cruising turbine rotor will remain stationary when the clutch is disengaged.

Other objects and advantages will become apparent from the following description taken in connection with the acompanying drawing, in which the single figure represents a sectional view of a large capacity disengageable positive type clutch in accordance with the invention.

Generally, the clutch of this invention comprises a hollow "quill" driving shaft carrying a gear adapted to be engaged by a driving pinion coupled to the turbine shaft, an axially shiftable coupling sleeve member having at either end thereof gear or spline teeth adapted to engage mating teeth on a driving flange member at the end of the drive shaft and a driven flange at the end of the output shaft. Guide bearing means are provided for supporting the coupling sleeve member in coaxial relation when retracted to the disengaged condition, and an annular friction brake member surrounds the coupling sleeve so as to engage it and hold it stationary when retracted. The coupling sleeve member is positioned axially by means of a push-pull rod extending through the hollow power input shaft, with manually actuated means for positioning the push-pull rod from the end of the drive shaft remote from the coupling sleeve.

Referring now more particularly to the drawing, the clutch is illustrated as contained in a suitable housing 1 having journal bearing means 2, 3 rotatably supporting the hollow or "quill" type input shaft 4, which has secured thereto, or formed integral therewith, a driving gear 5. It will be appreciated by those skilled in the art that gear 5 meshes with a smaller pinion (not shown) coupled to the prime mover shaft.

The clutch proper is contained in a housing portion 1a, which may comprise several annular sections bolted together as illustrated in the drawing, for convenience in assembling and disassembling the clutch for inspection and maintenance.

The lefthand end of drive shaft 4 is provided with a radially extending flange member 6, to which is secured by bolts 7 a cylinder member 8 having internal gear or spline teeth 9. The power output shaft 10 likewise has secured thereto by bolts 11 a shorter cylinder member 12 having internal gear or spline teeth 13.

The coupling sleeve member is shown generally at 14. At its lefthand end, it is provided with external gear or spline teeth 15 adapted to mesh with teeth 13 when in the engaged or coupled position, illustrated in the drawing. At the other end, the coupling sleeve is provided with teeth 16 adapted to slide longitudinally but always in engagement with the comparatively wider teeth 9. Intermediate the two rows of teeth 15, 16, coupling member 14 is provided with an enlarged portion 17 having a cylindrical journal bearing surface 18 and a tapered friction braking surface 19. The former is arranged to be engaged by a guide journal bearing 20 suitably supported from housing portion 1a, as for instance by the radially extending annular plate 21. As will be seen in the drawing, the surfaces 18, 19 are both spaced from the guide bearing 20 when the clutch is in the engaged position shown, but the journal bearing surface 18 is almost immediately engaged by guide bearing 20 when the coupling member 14 shifts axially to the right. Thus the free end of the coupling member 14 is positively supported in coaxial relation by the guide bearing 20 before the teeth 15 leave the teeth 13.

For insuring that the turbine rotor will be held stationary when the clutch is disengaged, an annular friction brake member 22 is adapted to engage the conical braking surface 19 when the coupling member moves to the righthand extreme of its range of movement. Brake ring 22 is supported on an annular plate 23, being secured thereto by bolts 24, for instance. Intermediate the circumferentially spaced bolts 24 are a plurality of supporting studs 25, which extend loosely through openings in the annular plate 23 and are threadedly secured in an inwardly extending annular flange 26 of housing portion 1a. Suitable retaining nuts 27 determine the extreme lefthand position of brake ring 22, and a coil spring 28 interposed between the housing member 26 and brake support plate 23 biases the brake ring to such lefthand position. Thus it will be apparent that the friction brake ring 22 is resiliently supported so it can deflect slightly to the right against the bias of springs 25 when the conical braking surface 19 on the coupling member 14 engages the brake ring when moved to the uncoupled position.

To complete the enclosure for the clutch and power output shaft 10, the extreme lefthand portion of housing portion 1a may be provided with liquid sealing means 29 which engage the outer circumference of the propeller shaft housing 30.

The mechanism for retracting the coupling sleeve member 14 is as follows. At its midportion, coupling sleeve 14 is provided with an inwardly extending flange 31 having a central axial bore and radially extending side surfaces forming thrust and journal bearing surfaces. The cooperating thrust bearing surfaces are formed on a pair of flange members 32, 33 supported on a positioning shaft member 34 having at its righthand end a radially extending flange member 35 provided with a threaded recess receiving an annular retaining nut 36. As will be apparent from the drawing, nut 36 cooperates with the flange 35 to define an annular recess receiving the end flange 37 of the push-pull tube 38. To prevent relative rotation between flanges 35, 37, the former is provided with two or more axially extending dowel pins 39 projecting into suitable recesses in the flange 37. It will be understood of course that the clearances between flange 37 and the walls of the recess defined between nut 36 and flange 35 are sufficiently generous that a freefloating self-aligning connection is provided between the push-pull rod 38 and the positioning rod member 34. This is required because of the slight change in angularity of the actuating rod 38 in moving through its complete range of operation, and it also permits the coupling sleeve complete freedom in aligning itself with the driving and driven flanges.

It will be seen from the drawing that the flange member 32 forms one radial thrust bearing surface and has an axially extending cylindrical portion 32a with a circumferential outer surface forming the journal bearing for engaging the coupling member portion 31. The other thrust bearing surface is formed on the flange member 33, which has a central bore engaging the positioning rod 34, being retained in position by the nut 40.

The means for positioning push-pull tube 38 to actuate the clutch is as follows. At the righthand end of quill shaft 4 is provided an end housing portion 1b, which may be formed in two halves secured to each other by bolts 41 and to the end of the bearing 3 by threaded fastenings 42. (The drawing shows the near half removed.) Rotatably supported in housing portion 1b is a transverse actuating shaft member 43 having a yoke 44 carrying a transverse pin 45 which extends through a hole in the righthand end member 38a of push-pull tube 38. Actuating shaft member 43 projects through the wall of housing portion 1b and carries at the exterior side thereof an actuating lever 46, which may be positioned automatically by the turbine governing mechanism (not shown), or by manual means comprising a handwheel 47 carried on a threaded shaft 48 supported in a bracket 49 suitably secured to housing 1. Disposed within the bracket 49 and having one end portion engaging housing 1 and an end fitting member 50a engaging the lever 46 is a biasing coil spring 50. It will be apparent from the drawing that the ball end of screw 48 engages the righthand side of lever 46, this engagement being maintained by the biasing effect of spring 50.

The lever 46 is shown in solid lines in the drawing to indicate the engaged condition of the clutch, the dotted line position 46a representing the disengaged condition. It will be obvious that the lever 46 may be moved to the left to disengage the clutch by rotating handwheel 47 so that screw 48 moves to the left against the bias of spring 50. This movement serves to pull rod 38 to the right so that the coupling sleeve member 14 moves axially to engage journal bearing surface 18 with the guide journal 20, then disengage teeth 15 from teeth 13, and subsequently cause the tapered friction surface 19 to engage the friction brake ring 22.

The lubrication arrangement for the clutch is as follows. Oil for the main bearings 2, 3 is supplied at suitable pressure to the conduits 2a, 3a, whence it flows to annular supply passages 2b, 3b and through a plurality of holes 2c, 3c to suitably arranged distributing grooves in the babbitted bearing linings. Lubricant for the clutch is supplied to a conduit 51 and by way of a flexible hose 52 to an inlet sleeve fitting 53. This sleeve is provided with a radially extending flange portion 54 the circumferential edge portion of which is loosely received between a projection or flange 55 formed on the end housing portion 1b and the adjacent end face of bearing 3. As will be apparent from the drawing, the oil supply sleeve 53 has a passage 56 arranged to be aligned with a port 57 communicating with a recess 58 in the push-pull rod end portion 38a, when the latter is in the "clutch engaged" position. Thus it will be apparent that oil is supplied to the bore of the push-pull tube 38 whence it flows through a central bore 34a in the positioning rod member 34 and through radial holes 34b to the journal bearing surfaces 32a. Lubricant passing through the clearances in this journal bearing flows radially outward to lubricate the thrust bearing surfaces of flanges 32, 33.

Some oil from the supply passage 34a also flows out through the clearance between the push-pull tube end flange 37 and the cooperating flange member 35 to lubricate the dowel pin 39 and reduce friction between any rubbing surfaces in this self-aligning coupling. Oil leaving the thrust bearing surface of flange 33 flows along the inner circumferential wall of the coupling member 14, as indicated by arrows 59, this leakage flow serving to lubricate the engaging spline teeth 13, 15. For lubricating the guide journal bearing 20, one or more radial holes 60 may be provided in the coupling member 14, centrifugal force tending to pump some oil through these small holes to the bearing surface of the journal 18.

The spline coupling teeth 9, 16 are lubricated by oil leaking from the main journal bearing 2 and passing through a plurality of holes 6a in the quill shaft end flange 6, as indicated by arrows 6b. These teeth are also supplied by the oil leaking from the thrust bearing surface of coupling flange 32, as indicated by arrows 32b.

It will be obvious from the drawing that when the actuating handle 46 is moved to the disengaged position, the oil inlet port 57 is no longer in alignment with supply passage 56, so that the oil supply to the clutch is discontinued when lever 46 is moved to the disengaged position.

The method of operation will be clear from the above description of the structure. When it is desired to disengage the prime mover, actuating lever 46 is moved to the dotted line position 46a, with the result that the push-pull tube 38 is drawn to the right and coupling sleeve member 14 moves axially to remove the teeth 15 from engagement with teeth 13. Movement of coupling sleeve 14 to the righthand extreme of its range of movement brings the friction brake surface 19 into engagement with the brake ring 22, thus insuring that the turbine rotor will remain stationary when disconnected.

If it is desired to disengage the clutch rapidly (as is necessary to protect the ends of the mating coupling spline teeth when the clutch is disengaged during operation), the operating handle 46 may be quickly moved by hand counterclockwise against the bias of spring 50. It may then be locked firmly in the "braked" condition by bringing up the screw 48 into engagement with the lever and tightening the handwheel 47 to give the braking force required.

It will be seen that the invention provides a novel positive type disconnecting clutch having an axially positioned coupling sleeve member which is positively guided by an auxiliary bearing when in the disengaged condition, so as to assure proper concentric relation between coupling sleeve and the driven flange member during the engaging and disengaging processes, with friction brake means for holding the prime mover shaft stationary when disengaged.

While only one specific embodiment of the invention has been described herein, it will be apparent to those skilled in the art that many modifications may be made and equivalent mechanical means substituted; and it is desired to cover by the appended claims all such changes as fall within the true spirit and scope of the invention.

What we claim as new and desire to secure by Letters Patent of the United States is:

1. A positive type clutch comprising a hollow quill shaft having a central bore extending entirely therethrough with a radially extending driving flange at one end thereof, a first internally splined ring member secured to said driving flange, a second driven shaft having a flanged end adjacent but spaced axially from said driving flange, a second internally splined ring member secured to said driven flange, a coupling sleeve member coaxial with said first and second shafts and adapted to slide axially between the driving and driven flanges, said coupling member having at either end thereof externally splined portions adapted to mesh with said first and second internal splines respectively, said first internal spline being of an axial length at least equal to the axial travel of the coupling sleeve from the engaged to the disengaged condition whereby the driving flange is always in driving engagement with the coupling sleeve, said second internal spline being of such axial length that the coupling sleeve spline disengages from the driven flange spline when the coupling sleeve moves axially towards the driving flange, auxiliary guide bearing means surrounding the coupling sleeve and adapted to engage a journal bearing surface on the coupling sleeve member, the external surface of the coupling sleeve defining also a tapered braking surface with its smaller diameter end facing towards the driving flange member, a friction brake ring member resiliently supported coaxial with the coupling member and so located axially that said tapered friction surface is disengaged from the brake ring when the clutch is in the engaged position, and means for shifting the coupling sleeve member axially towards the driving flange member including a push-pull rod extending through the central bore of the quill shaft and lever means at the end of the quill shaft remote from said coupling member for actuating the push-pull rod to cause the coupling sleeve member to first engage the guide journal bearing, subsequent further axial movement of the coupling sleeve serving to disengage the driven flange splines and then engage the tapered friction surface with the brake ring, whereby the quill shaft is held stationary when the clutch is in disengaged condition.

2. A positive type clutch comprising a hollow quill shaft having a central bore extending entirely therethrough with a radially extending driving flange member at one end thereof, said flange member having a circumferential row of internal spline teeth, a second shaft with a flanged end coaxial with and spaced from the driving flange and having a second row of internal splines, a coupling sleeve member disposed coaxially between the first and second shafts and adapted to slide axially therebetween, said coupling member having at either end thereof external splines adapted to mesh with the adjacent splines of the driving and driven flanges respectively, one of said pairs of mating splines being in driving engagement for all axial positions of the coupling member while the other is disengaged at one extreme of the range of coupling member movement, a portion of the sleeve between said splines defining a journal bearing and a brake member, auxiliary guide bearing means adapted to engage said journal bearing when the latter moves axially towards disengaged position whereby the coupling sleeve is held coaxial when the disengageable splines are in separated condition, brake means adapted to be engaged by said brake member of the coupling sleeve to hold the driving shaft stationary when the coupling sleeve moves to the disengaged position, and means for shifting the coupling sleeve member axially including a push-pull rod extending through the central bore of the quill shaft, and means at the end of the quill shaft remote from the coupling sleeve for positioning said rod to cause the coupling sleeve member to first engage the guide journal means, subsequent further axial movement of the coupling sleeve serving to separate the disengageable splines and then engage the sleeve with the brake means for holding the quill shaft stationary when the clutch is disengaged.

3. A positive type clutch comprising a hollow quill shaft with a central bore extending entirely therethrough and a radially extending driving flange disposed at one end thereof and having a circumferential row of internal splines, a second shaft with a coaxial end portion spaced from said first flange and having a second row of internal splines, a coupling sleeve member disposed coaxially between the first and second shafts and adapted to slide axially therebetween, said coupling member having externally splined end portions, one of which is adapted to drivingly engage one of the internal splines for all axial positions of the coupling member while the other external spline is in driving engagement with the associated internal spline only when the coupling sleeve is at one end of its range of movement, a circumferential portion of the sleeve intermediate the splines defining a journal bearing and a brake member, auxiliary guide bearing means adapted to engage said journal bearing surface for holding the sleeve coaxial when in disengaged position, brake means adapted to be engaged by said brake member when in disengaged condition for holding the coupling member and connected shaft stationary, and means for shifting the coupling sleeve axially to separate the disengageable splines, said shifting means including a push-pull rod extending through the central bore of the quill shaft with actuating means disposed at the end of the quill shaft remote from the coupling member for positioning the push-pull rod to cause the coupling sleeve member to first engage the guide journal bearing while subsequent further axial movement of the coupling sleeve serves to disconnect the disengageable splines and then engage the brake means.

4. A positive type clutch comprising a hollow quill shaft having a central bore extending entirely therethrough with a radially extending driving flange at one end having an internal spline, a second shaft disposed coaxially and having an end portion spaced axially from the first flange and having a second internal spline, a coupling sleeve member disposed coaxially between said first and second shafts and adapted to slide axially therebetween, the coupling member having end portions with external splines adapted to mesh with said first and second shaft splines respectively, one of said splines being of such axial length that the coupling sleeve is always in driving engagement with the associated shaft while the other mating splines are adapted to be separated when the coupling member is moved axially to the disengaged position, annular guide bearing means surrounding the coupling sleeve and adapted to engage a journal bearing surface formed on the exterior of the coupling sleeve intermediate said end splines, the external surface of the coupling sleeve member defining also a tapered brake surface, a friction brake ring member supported coaxial with the coupling member and so located axially as to be disengaged from said tapered surface when the clutch is in engaged position, and means for shifting the coupling sleeve member axially including a push-pull rod extending through the central bore of the quill shaft with means at the end of the quill shaft remote from the coupling member for actuating the push-pull rod to cause the coupling sleeve member to first engage the guide bearing, subsequent further axial movement of the coupling sleeve serving to separate the disengageable splines and then effect engagement of the tapered brake surface of the coupling member with the brake ring, whereby the quill shaft is held stationary when the clutch is in disengaged condition.

KERMIT L. DARRAH.
FRANCIS O. FRIDELL.

REFERENCES CITED

The following references are of record in the file of this patent:

UNITED STATES PATENTS

| Number | Name | Date |
|---|---|---|
| 168,196 | Turner | Sept. 28, 1875 |
| 906,841 | Whitcomb | Dec. 15, 1908 |
| 1,438,150 | Voss | Dec. 5, 1922 |